United States Patent
Chaumet et al.

(10) Patent No.: US 8,294,327 B2
(45) Date of Patent: Oct. 23, 2012

(54) METHOD AND DEVICE FOR ATTACHING AN ELECTRICAL WIRE WINDING TO A COMMUTATOR

(75) Inventors: Pascal Chaumet, Hagenau (FR); Axel Diederichs, Buehl (DE); Achim Neubauer, Sinzheim-Vormberg (DE); Andreas Friedmann, Buehl (DE); Dirk Altmeyer, Buehl (DE); Helmut Huber, Achern (DE); Werner Herm, Buehl (DE); Edgar Seiler-Wegner, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 292 days.

(21) Appl. No.: 12/440,206

(22) PCT Filed: Sep. 17, 2007

(86) PCT No.: PCT/EP2007/059767
§ 371 (c)(1),
(2), (4) Date: Aug. 11, 2010

(87) PCT Pub. No.: WO2008/040630
PCT Pub. Date: Apr. 10, 2008

(65) Prior Publication Data
US 2010/0295409 A1    Nov. 25, 2010

(30) Foreign Application Priority Data
Sep. 29, 2006  (DE) .......................... 10 2006 046 667

(51) Int. Cl.
*H01R 39/04* (2006.01)
*H01R 39/32* (2006.01)
*H01R 43/06* (2006.01)

(52) U.S. Cl. ............................ 310/234; 310/233; 29/597
(58) Field of Classification Search .................. 310/233, 310/234; 219/85.22; 29/597
See application file for complete search history.

(56) References Cited

U.S. PATENT DOCUMENTS

| | | | |
|---|---|---|---|
| 3,781,981 A * | 1/1974 | Miura et al. ..................... 29/597 |
| 4,686,347 A * | 8/1987 | Arakawa et al. ........... 219/117.1 |
| 5,111,015 A * | 5/1992 | Riordan ..................... 219/56.22 |
| 5,115,557 A * | 5/1992 | Visser et al. ..................... 29/597 |
| 5,484,976 A * | 1/1996 | Sbalchiero et al. ........... 219/110 |
| 2002/0112340 A1* | 8/2002 | Haefele ........................... 29/597 |
| 2002/0185930 A1* | 12/2002 | Furuya et al. ................. 310/233 |
| 2004/0221445 A1 | 11/2004 | Furuya et al. |

FOREIGN PATENT DOCUMENTS

| | | |
|---|---|---|
| CN | 1215632 C | 8/2005 |
| CN | 2765706 Y | 3/2006 |
| DE | 89 02 562 | 7/1990 |
| JP | 60 032549 | 2/1985 |
| JP | 09 154263 | 6/1997 |

* cited by examiner

*Primary Examiner* — Quyen Leung
*Assistant Examiner* — Jose Gonzalez Quinones
(74) *Attorney, Agent, or Firm* — Merchant & Gould P.C.

(57) ABSTRACT

The invention relates to a method and device for producing an electric machine, an electric machine with a commutator, having commutator hooks for fixing electric wire windings with solder arranged between the commutator hooks and the wire winding and two electrodes arranged adjacent to each other which are pressed against the commutator hooks. An electric current is passed through the commutator hooks by means of electrodes such that the solder melts and forms a connection to the wire winding.

15 Claims, 1 Drawing Sheet

METHOD AND DEVICE FOR ATTACHING AN ELECTRICAL WIRE WINDING TO A COMMUTATOR

TECHNICAL FIELD

The invention is based on a procedure and a device for producing an electric machine according to the type of the independent claims.

BACKGROUND

Due to G 89 02 562.8 an ultra sound welding device for fixing wire ends of wire windings at terminal lugs of a commutator became known. Thereby a sonotrode of the ultra sound welding device presses the wire against a terminal lug of the commutator. Thereby ultra sound energy is directly inserted into the wire, which warms up so much that it creates a welding connection with the terminal lug of the commutator. Such an ultra welding procedure has the disadvantage that the material of the wire and the terminal lug are selectively melted in order to create a strong connection. Such a strong heat input can cause a damaging of the components that are adjoining the terminal lug.

SUMMARY

In contrast the procedure and the device according to the invention with the characteristics of the independent claims has the advantage that a good mechanic and electric connection between the wire winding and the commutator is created by inserting the solder between the wire winding and the commutator hooks, without melting the core material of the wire winding and the commutator hook. Thereby components that are for example alloyed to the commutator hook or adjoining plastic parts are protected from excessive heating. The current, which flow through the commutator hook over the electrodes, can be measured in such a way that the solder is melted for creating a solder connection between the wire winding and the commutator without creating a welding connection between the wire winding and the commutator.

Due to the measures that are listed in the dependent claims advantageous improvements and upgrades of the characteristics that are listed in the independent claims are possible. In order to create a mechanically strong connection between the wire winding and the commutator the wire is favorably arranged inside of the bending area, at which the commutator hook is formed at a corresponding counter surface. Thereby the free end of the commutator hook is pressed against the counter surface so that the wire windings are firmly embraced by the commutator hooks.

The free shank of the commutator hook can advantageously be pressed against the counter surface by the electrodes, after the wire windings have been inserted in the u-formed or v-formed opened commutator hook. During this first press phase the electrodes are not yet energized in order to minimize the heat input into the commutator hook.

By the subsequent aimed energizing of the electrodes heat can be inserted into the commutator hook in such a big amount that the isolation of the wire winding is removed, the solder melts and the free shank of the commutator is formed warmly under the pressure of the electrodes.

It is very favorable to press the electrodes still against the commutator hooks after creating the solder connection without a current supply in order to allow an effective heat discharge by the electrodes.

Expediently the electrodes abut on the commutator hook in a distance of ca. 0.5 to 3 mm in order to prevent a short circuit between the electrodes during the connecting procedure according to the invention. By covering the electrodes as far as possible with the commutator hook it can be pressed on the one hand with its entire surface against the counter surface and on the other hand energy can be transported fast into the commutator hook and out of it. Silver or tin qualify best as solder material or an alloying with these materials, which melts or alloy approximately between 200 and 300° C.—preferably between 210 and 240° C. Thereby a damaging of the components that adjoin the counter surface can be prevented.

The solder can be arranged at low-cost by layering the commutator hook together with the counter surface on the entire surface with the solder. The solder can be then melted selectively in the area, in which the commutator hook lies after the pressing against the counter surface, by which electrode current can be melted.

The commutator hook with the counter surface is advantageously made of copper-bearing material, which has a significantly higher melting point than the solder.

The procedure according to the invention is especially applicable for creating a flat-commutator, at which the counter surface provides a radial extension, which is connected with a carbon-running surface for the electric sliding contacts. The connection layer between the radial extension and the carbon-running surface can be effectively protected by the producing procedure according to the invention from an overheating.

When implementing the procedure according to the invention the electrode device provides for example two adjusting cylinders, with which the two electrodes can be linearly independent from each other. Thereby the two electrodes can be pressed on the commutator hook with a small distance from each other whereby the pressing forces or the adjusting ways of both electrodes can be adjusted differently.

By the producing procedure according to the invention an electric machine can be produced, at which the wire wiring is connected with the commutator and the counter surface by a solder connection. Thereby a bead and/or a heel is created at the radial outer circumferential surface of the commutator hook, which runs transversely to the armature wave and which has been formed by the adjoining electrodes that are pressed against the commutator hook.

According to the invention at the electric machine one or two or three or several wire windings can be connected with the commutator hook by the solder connection. The wire windings connect the commutator hook with the armature lamellae stack, on which the wire windings are coiled especially for creating a rotor.

BRIEF DESCRIPTION OF THE DRAWINGS

The embodiments of the invention are shown in the drawings and further explained in the subsequent description.

DETAILED DESCRIPTION

Figure 1:
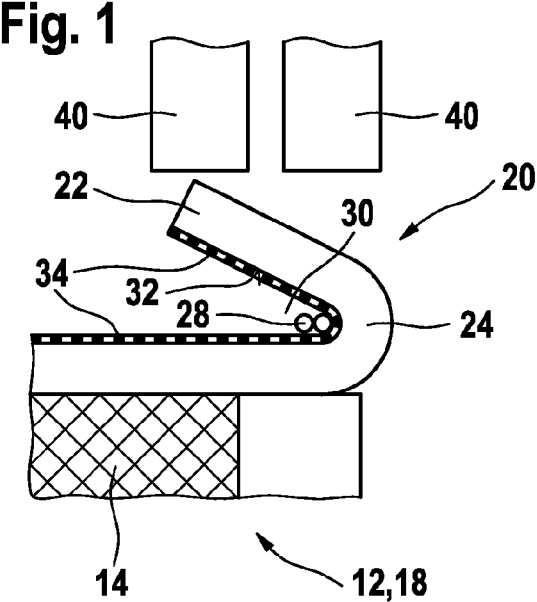
FIG. 1 shows schematically a cut through an electrode arrangement according to the invention with a commutator.

FIG. 1 shows a commutator 12 as part of the electric machine 10, which is fixed on a rotor spindle 16 by a commutator hook 14. The commutator 12 is in FIG. 1 construed as drum commutator 18 or as flat commutator 19, at whose outer circumference several commutator hooks are arranged. The commutator hook 20 provides a free shank 22, which is connected over a bending area 24 with the counter surface 26 of the commutator hook 20. For winding up an electric wire winding 28 onto the electric machine 10 the commutator hook 20 is designed in a V-form or a U-form, so that the wire windings 28 can be simply inserted into the open lug 30 of the commutator hook 20. The counter surface 26 and the inside 32 of the free end 22 are layered with a solder 34 even before the wire winding 28 is inserted into the open lug 30. In order to connect the wire winding 28 electrically and mechanically with the commutator 12 after finishing the winding process of the electric machine 10, a solder connection is created with the aid of two electrodes 40. Therefore the two electrodes 40 are pressed against the free shank 22 of the commutator hook 20 with a distance 42 to each other. In the embodiment in FIG. 1 the two electrodes 40 are pressed parallel to each other against the commutator hook 20, whereby the distance 42 amounts for example to 0.5 to 3 mm. During the pressing of the electrodes 40—approximately vertically to the counter surface 26—the free shank 22 is pressed against the counter surface 26. During this procedure step the electrodes 40 are not yet energized so that a reforming of the commutator hook 20 is a cold reforming Subsequently the two electrodes 40 are energized so that a current flows over the electrodes 40 through the commutator hook 20. Thereby the commutator hook 20 is warmed up so strong that an isolation layer 29 on the wire windings 29 evaporates and that solder 34 between the free shank 22 and the counter surface 26 melts. In this state the commutator hook 20 is so warm that it can be easily reformed by the pressing pressure 44 of the electrodes 40 and therefore it is simply minted.

Figure 2:
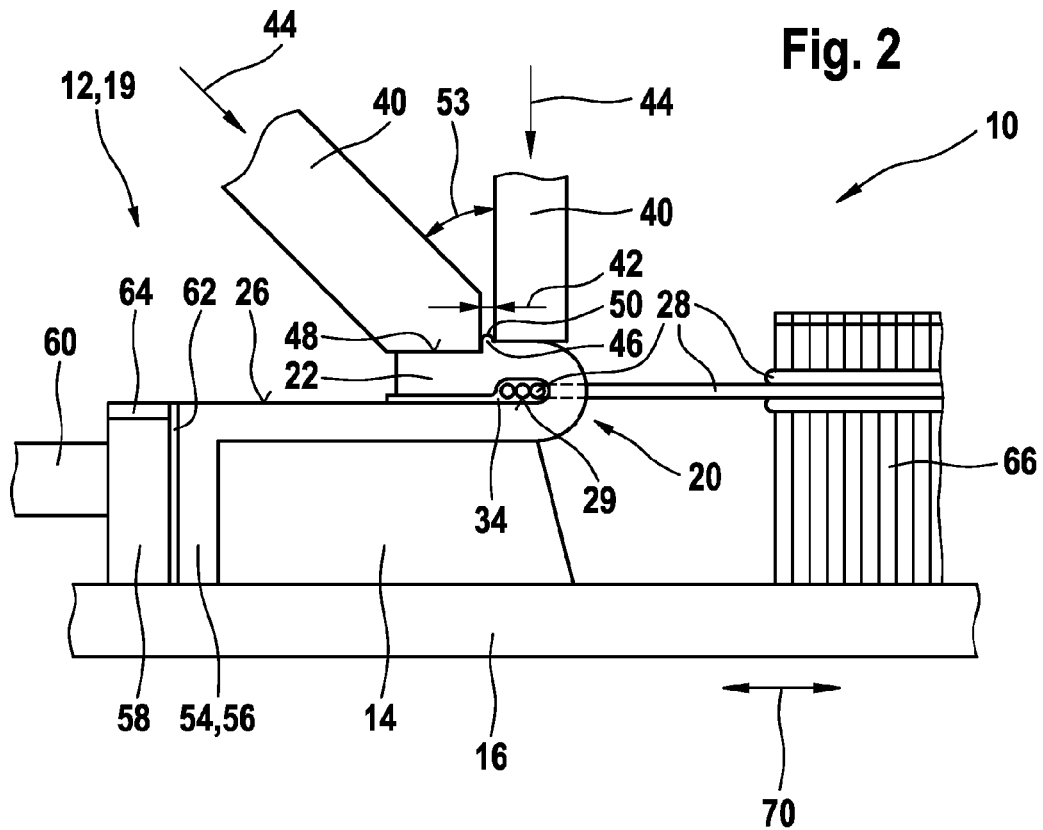
FIG. 2 is a variation of the schematically shown producing procedure.

Such a procedure step is for example shown in FIG. 2, at which the left electrode 40 is adjusted a little stronger against the counter surface 26 than the right electrode 40. Thereby a heel 46 is formed at the outer circumferential surface 48 of the commutator hook 20 in the area of the free shank 22. Due to the pressing pressure of the two electrodes 40 a bead 50 is created, which spans in circumferential direction 68 and which provides a width 52, which corresponds approximately with the distance 42 between the electrodes 40. The melted solder 34 creates now a tight fit between the wire windings 28 and the commutator hook 20 or the counter surface 26. Thereby a mechanically stabile connection on the one hand and an electrically well conducting contact between the wire windings 28 and the commutator 12 on the other hand is created. In the embodiment of FIG. 2 the left electrode 40 for example is not adjusted parallel to the right electrode 40, but under an angle 53. At this solution more installation space for the electrode connections or a not shown adjusting device of the electrodes 40 is available between the two electrodes 40. The solder 34 is arranged in this embodiment only in the area of the commutator hook 20 and does not span over the entire axial area of the counter surface 26. The counter surface 26 is here connected with a radial extension 54, which is designed as carrier 56 for a carbon running surface 58. The commutator 12 is hereby construed as flat commutator 19 so that the carbon running surfaces 58 are connected with a heat sensitive connection layer 82 with radial extension 54 and that it is surrounded at the outer circumference 48 with a plastic layer 64. The electrodes 40 are still pressed against the commutator hook 20 for a certain time after turning off the filament current in order to discharge the heat from the commutator 12. The wire windings 28 connect the commutator 12 with an armature lamellae stack 66, on which the wire windings 28 are winded up. Depending on the configuration of the electric machine 10 a different amount of winding strands are arranged on the armature lamellae stack 66, which are connected with a different amount of commutator hooks 20. Therefore the amount of individual wire winding 28, which are soldered with the individual commutator hooks 20, wary correspondingly so that for example one or two or three or several wire windings 28 are lead through the lug 30. The amount of the commutator hooks 20 corresponds with the amount of different commutator lamellae, whereby all commutator hooks 20 are connected with the wire winding 28 after each other or at least almost simultaneously according to the invention.

Figure 3:
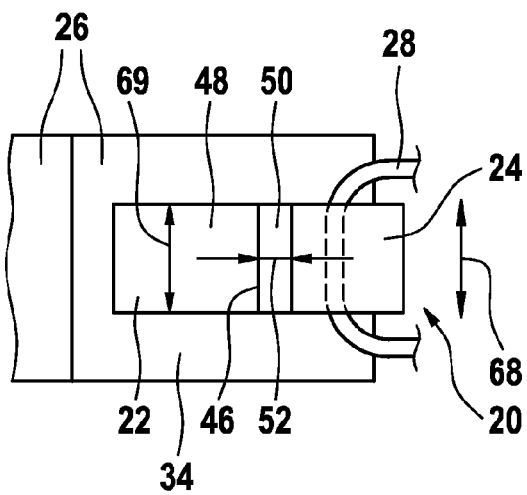
FIG. 3 is a section of an electric machine that has been produced according to the invention.

FIG. 3 shows an extract of a collector 12, which has been connected with a wire winding 28 by the producing procedure according to the invention. The free shank 22 lies thereby at the counter surface 26 and is connected with it by the solder 34. The solder 34 also creates a mechanic and electric connection between the wire winding 28 and the counter surface 26, as well as the inside 32 of the free shank 22. At the outer circumference 48 of the commutator hook 20 the bead 50 is created, whose width 52 is equivalent to a distance 42, with which the two electrodes 40 have been pressed against the commutator hook 20. The bead 50 spans here over the entire circumferential surface 69 of the free shank 22 and creates simultaneously a heel 46 with regard to the axial direction 70 as an option. The commutator hook 20 is hereby construed narrower in circumferential direction 68 than the opposing counter surface 26.

The electrodes 40 are for example designed as wolfram— electrodes, whereby one electrode 40 is put on the end of the free shank 22 and the other electrode 40 covers the bending area 24 of the commutator hook 20. During the energization of the electrodes 40 they are tracked towards the counter surface 26 so that the free shank 22 lies on at the wire windings 28 as well as on the counter surface 26 due to the heat forming.

It shall noted that with regard to the embodiments that have been shown in the figures and the description various combination possibilities of the individual characteristics are possible. Thus the arrangement of the solder 34 or example can be varied according to the application and if necessary be inserted point by point in the contact area between the wire winding 28 and the commutator hook 20. Also different materials can be used as a solder 34, whose melting temperature prevents a melting of the commutator hook 20 and/or the wire windings 28. Moreover a concrete form and connection of the commutator hook 20 at the commutator 12 can be varied, whereby in particular the axial construction length of the commutator can be reduced by the producing procedure according to the invention. Preferably the electrodes 40 are used with a square-shaped contact face. The forming of the electrodes 40 as well as their pressing device can also be adjusted to the electric machines that have to be produced. Preferably the procedure according to the invention is applicable for the production of a rotor of an electromotor for movable parts in the motor vehicle.

The invention claimed is:

1. A method of producing an electric motor with a commutator, wherein the commutator comprises at least one commutator hook for mounting at least one electric wire winding, the method comprising:
arranging a solder between the at least one commutator hook and the at least one wire winding;
pressing a pair of electrodes that are arranged adjacent to each other and angled to each other against the at least one commutator hook;

passing an electric current through the at least one commutator hook via the pair of the electrodes to melt the solder and form a connection to the wire winding;

pressing a free shank of the at least one commutator hook about a bending area formed at a mating surface against the mating surface with the pair of the electrodes, wherein the at least one wire winding is positioned between the free shank and the mating surface; and;

mechanically pressing the free shank with the pair of the electrodes in a direction of the mating surface prior to passing the electric current through the at least one commutator hook.

2. The method of claim 1, further comprising passing the electric current through the at least one commutator hook until an insulation of the wire winding evaporates and the free shank is hot-pressed.

3. The method of claim 1, further comprising pressing the pair of the electrodes against the at least one commutator hook after turning off the electric current in order to conduct heat away from the at least one commutator hook into the pair of the electrodes.

4. The method of claim 1, wherein the pair of the electrodes lie on the at least one commutator hook a distance of between 0.5 mm to 3 mm, and wherein the pair of the electrodes span over an entire circumferential area of the at least one commutator hook.

5. The method of claim 1, further comprising forming the solder from at least one of silver and tin, wherein the solder melts or at least partially alloys at a temperature between 200° C. and 300° C.

6. The method of claim 1, further comprising coating at least one of the at least one commutator hook and the mating surface with solder prior to inserting the wire wiring into the at least one commutator hook.

7. The method of claim 1, further comprising forming the at least one commutator hook and the mating surface from copper, wherein the copper does not melt during the passing of the electric current.

8. The method of claim 1, further comprising forming the counter mating surface as a part of a cylinder jacket that includes a radial projection, wherein the radial projection is a support for a carbon-running surface that interacts with a wiper contact of the electric motor.

9. A device for connecting a wire winding with a commutator hook of a commutator, the device comprising:
a solder that is arranged between the commutator hook and the wire winding; and
a pair of electrodes that are arranged adjacent to each other and angled to each other and are pressed against the commutator hook, wherein the pair of the electrodes are pressed independently with a small distance between each other against a shank of the commutator hook, and wherein an electric current is passed through the commutator hook via the pair of the electrodes to melt the solder and form a connection to the wire winding.

10. An electric motor comprising:
a commutator connected with at least one wire winding by at least one commutator hook ;
wherein a solder that connects the wire winding with the commutator hook is arranged between the wire winding and the at least one commutator hook and a mating surface; and
wherein the at least one commutator hook is formed compactly around the wire winding by a pair of electrodes that are arranged adjacent to each other and angled to each other and are pressed against the commutator hook.

11. The electric machine of claim 10, wherein the commutator hook comprises, at an outer circumferential area of the commutator hook, at least one of a bead and a heel that spans in a circumferential direction.

12. The electric machine of claim 10, wherein one or more of the wire windings are arranged between the at least one commutator hook and the mating surface that span over an armature lamellae stack.

13. The electric motor of claim 10, wherein an axial construction length of the commutator is compactly formed by the pair of the electrodes.

14. The electric motor of claim 10, wherein pressing one of the pair of the electrodes is done independently of pressing another of the pair of the electrodes.

15. The method of claim 1, wherein the pressing of one of the pair of the electrodes is done independently of the pressing of another of the pair of the electrodes.

\* \* \* \* \*